United States Patent
Yoon et al.

(10) Patent No.: US 8,874,339 B2
(45) Date of Patent: Oct. 28, 2014

(54) METHOD OF ESTIMATING TRANSMISSION TORQUE OF DRY CLUTCH OF VEHICLE

(71) Applicants: Hyundai Motor Company, Seoul (KR); Kia Motors Corp., Seoul (KR)

(72) Inventors: Young Min Yoon, Seoul (KR); So Young Lee, Seoul (KR); Sung Hyun Cho, Suwon-si (KR); Ho Young Lee, Bucheon-si (KR); Joung Chul Kim, Suwon-si (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/797,359

(22) Filed: Mar. 12, 2013

(65) Prior Publication Data

US 2014/0121924 A1 May 1, 2014

(30) Foreign Application Priority Data

Oct. 30, 2012 (KR) ........................ 10-2012-0121630

(51) Int. Cl.
*F16D 48/00* (2006.01)

(52) U.S. Cl.
CPC ..................................... *F16D 48/00* (2013.01)
USPC ............................................. 701/67; 701/68

(58) Field of Classification Search
CPC ... B60W 10/06; B60W 10/02; B60W 10/113; F16D 14/00; F16D 48/06
USPC .................. 701/67; 477/5, 34, 171, 173, 181; 192/215, 84.6; 180/245, 65.275
See application file for complete search history.

(56) References Cited

U.S. PATENT DOCUMENTS

| | | | |
|---|---|---|---|
| 4,574,926 A | 3/1986 | Bubak | |
| 4,618,043 A | 10/1986 | Hattori et al. | |
| 4,867,287 A | 9/1989 | Hayashi | |
| 4,969,545 A | 11/1990 | Hayashi | |
| 5,020,645 A * | 6/1991 | Sasa | 477/34 |
| 5,211,080 A | 5/1993 | Leising et al. | |
| 5,282,401 A | 2/1994 | Hebbale et al. | |
| 5,935,043 A | 8/1999 | Watanabe et al. | |
| 8,332,111 B2 | 12/2012 | McDonnell et al. | |
| 2010/0279818 A1* | 11/2010 | Soliman et al. | 477/5 |
| 2012/0109477 A1 | 5/2012 | McDonnell et al. | |
| 2012/0298466 A1* | 11/2012 | Nedachi et al. | 192/84.6 |
| 2013/0018556 A1 | 1/2013 | Williams et al. | |

FOREIGN PATENT DOCUMENTS

| | | |
|---|---|---|
| JP | 2004-270624 A | 9/2004 |
| JP | 2010-144851 A | 7/2010 |

* cited by examiner

*Primary Examiner* — Marthe Marc-Coleman
(74) *Attorney, Agent, or Firm* — Morgan, Lewis & Bockius LLP

(57) ABSTRACT

A method of estimating transmission torque of a vehicle dry clutch may suitably estimate a variation in the characteristics of transmission torque relative to the actuator stroke of a dry clutch even during the driving of a vehicle, so that the dry clutch is more suitably controlled. In the method of estimating transmission torque of a dry clutch, a clutch is released so that a slip of the clutch occurs. If the slip of the clutch has occurred, the slip of the clutch is uniformly maintained. If the slip of the clutch is uniformly maintained, a relationship between a stroke of an actuator of the clutch and transmission torque of the clutch is determined from a relationship between the stroke of the actuator and torque of an engine in the uniformly maintained slip state.

5 Claims, 3 Drawing Sheets

METHOD OF ESTIMATING TRANSMISSION TORQUE OF DRY CLUTCH OF VEHICLE

CROSS-REFERENCE TO RELATED APPLICATION

The present application claims priority of Korean Patent Application Number 10-2012-0121630 filed Oct. 30, 2012, the entire contents of which application is incorporated herein for all purposes by this reference.

BACKGROUND OF INVENTION

1. Field of Invention

The present invention relates, in general, to technology for estimating the transmission torque of a dry clutch arranged between the engine and the transmission of a vehicle and, more particularly, to technology for exactly estimating a relationship between the actuating stroke of an actuator and the transmission torque of a dry clutch used for an automated transmission such as an Automated Manual Transmission (AMT) so that the dry clutch can be suitably controlled using the actuator.

2. Description of Related Art

An automated manual transmission, such as an AMT or a Double Clutch Transmission (DCT), is a system for automatically controlling a manual transmission mechanism, and is configured to transmit the torque of an engine to a gear-shift mechanism using a dry clutch, unlike a typical Automatic Transmission (NT) that uses a torque converter and a wet multi-plate clutch.

The dry clutch has the characteristics of its transmission torque greatly varying with a plurality of factors, such as the allowance of each of several components, an abrasion degree caused by the progress of endurance, thermal deformation caused by high temperature, and a variation in the friction factor of a disk, thus making it difficult to estimate torque transmitted to the dry clutch during the driving of a vehicle.

The dry clutch is controlled by an actuator, and the actuator is typically controlled by a Torque-Speed (T-S) curve indicating a variation in the transmission torque of the dry clutch relative to the stroke of the actuator. As described above, since the transmission torque of the dry clutch varies greatly due to various factors, when the variation in the transmission torque can be neither sensed nor exactly reflected during the control of the dry clutch, an excessive slip of the dry clutch may occur or a shock may be caused in the dry clutch, thus requiring an algorithm for estimating the torque characteristics of the dry clutch in real time.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art.

Various aspects of the present invention provide for a method of estimating the transmission torque of the dry clutch of a vehicle, which can suitably estimate a variation in the characteristics of transmission torque relative to the actuator stroke of a dry clutch even during the driving of a vehicle, so that the dry clutch is more suitably controlled, thus acquiring the feeling of soft gear shift by preventing a gear shift shock and ensuring the durability of the dry clutch by preventing an excessive slip of the dry clutch.

Various aspects of the present invention provide for a method of estimating transmission torque of a dry clutch, including a) releasing a clutch so that a slip of the clutch occurs; b) if the slip of the clutch has occurred as a result of performance of a), uniformly maintaining the slip of the clutch; and c) if the slip of the clutch is uniformly maintained at b), determining a relationship between a stroke of an actuator of the clutch and transmission torque of the clutch from a relationship between the stroke of the actuator and torque of an engine in the uniformly maintained slip state.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
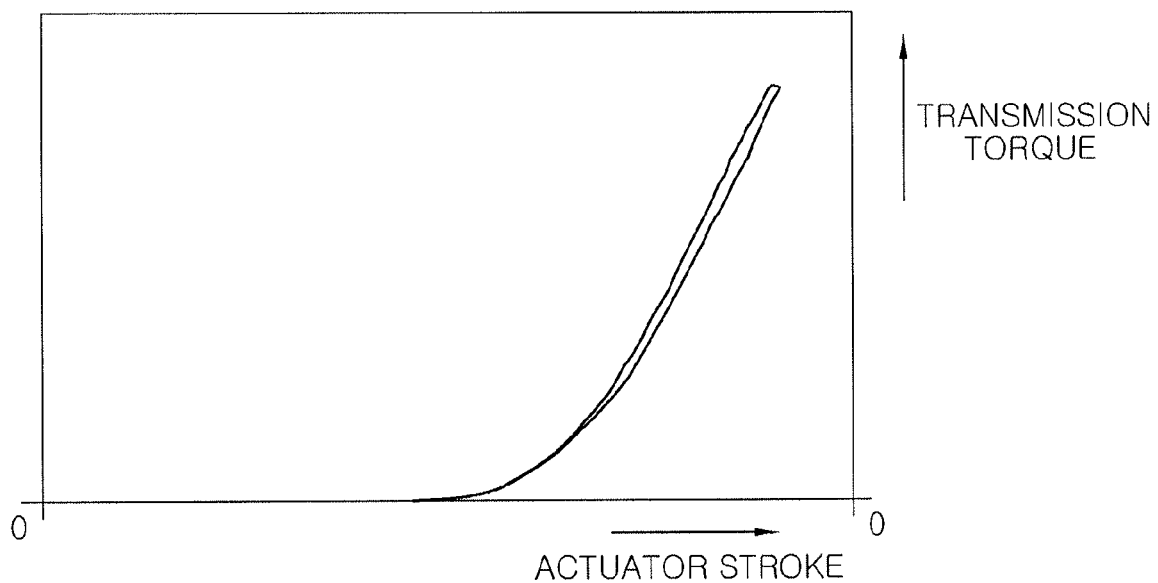
FIG. 1 is a diagram showing an example of a Torque-Speed (T-S) curve indicating a variation in transmission torque of a dry clutch relative to the stoke of an actuator.
Figure 2:
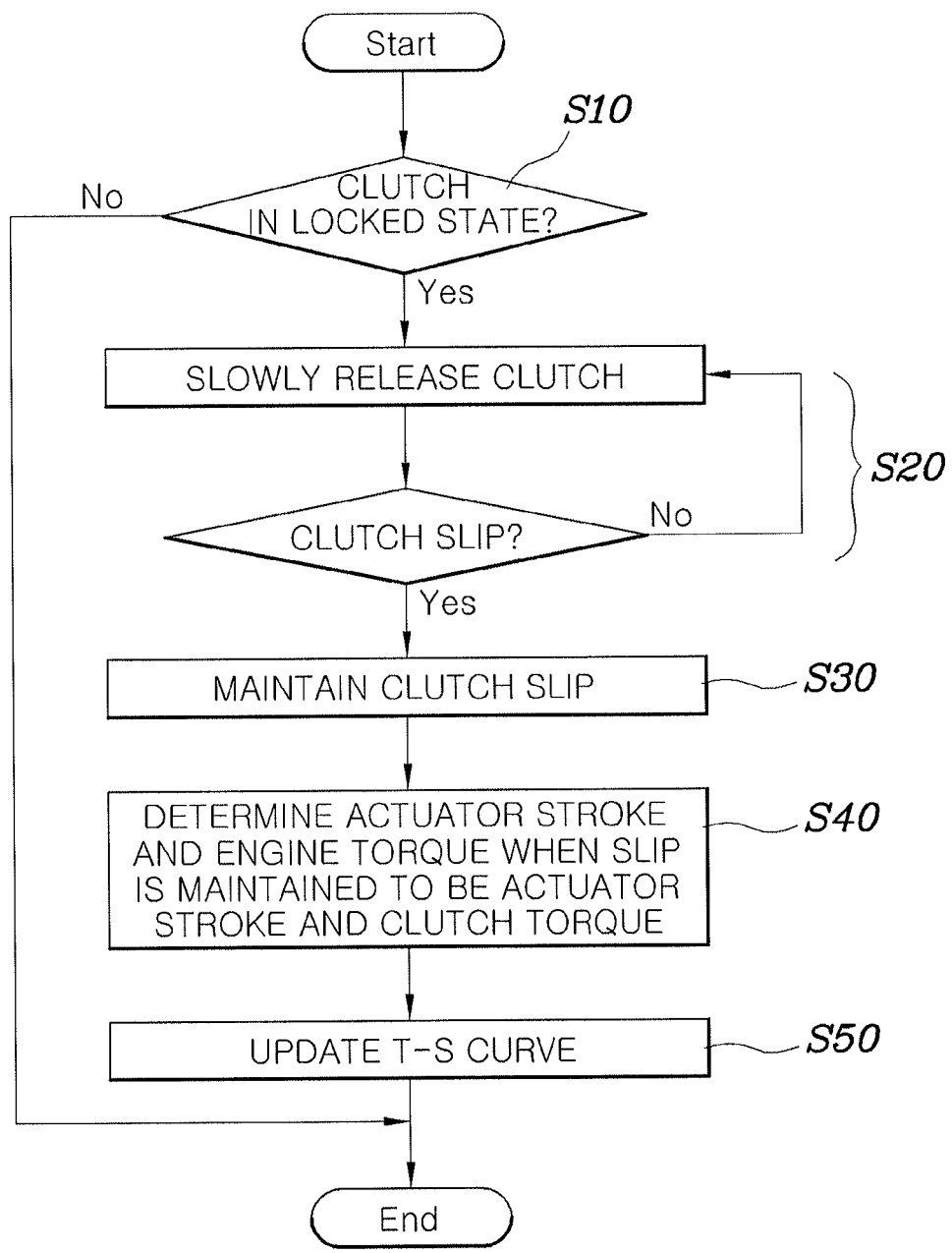
FIG. 2 is a flowchart showing an exemplary method of estimating the transmission torque of the dry clutch of a vehicle according to the present invention.

Referring to FIG. 2, various embodiments of a method of estimating the transmission torque of the dry clutch of a vehicle according to the present invention includes the slip guidance step S20 of releasing the dry clutch so that the slip of the dry clutch occurs; the slip maintenance step S30 of if the slip of the clutch has occurred as a result of the performance of the slip guidance step S20, uniformly maintaining the slip of the clutch; and the transmission torque determination step S40 of, if the slip of the clutch is uniformly maintained at the slip maintenance step S30, determining a relationship between the stroke of the actuator and the transmission torque of the clutch from a relationship between the stroke of the actuator of the clutch and the torque of an engine in the uniformly maintained slip state.

That is, if the slip of the clutch occurs in such a way that the slip guidance step S20 is performed by manipulating the clutch in a direction from a locked state in which the clutch is engaged to a state in which the clutch is released, the actuator of the clutch is controlled such that the amount of slip of the clutch is maintained at a uniform level. Using a principle in which the engine torque obtained when the slip of the clutch is uniformly maintained is identical to the transmission torque of the clutch, the transmission torque of the clutch relative to the stroke of the actuator is obtained at the transmission torque determination step S40. A current Torque-Speed (T-S) curve is suitably changed and updated using the transmission torque of the clutch. Thereafter, the actuator of the clutch is controlled using the updated T-S curve, with the result that the transmission torque of the clutch can be more exactly controlled. Accordingly, the occurrence of gear shift shock is prevented, and an unnecessary slip of the clutch is also prevented, thus improving the feeling of gear shift and enhancing the durability of the clutch.

Before the slip guidance step S20, the clutch lock determination step S10 of determining whether the clutch is engaged is performed, and then the slip guidance step S20 is performed only if the clutch is engaged and locked.

Figure 3:
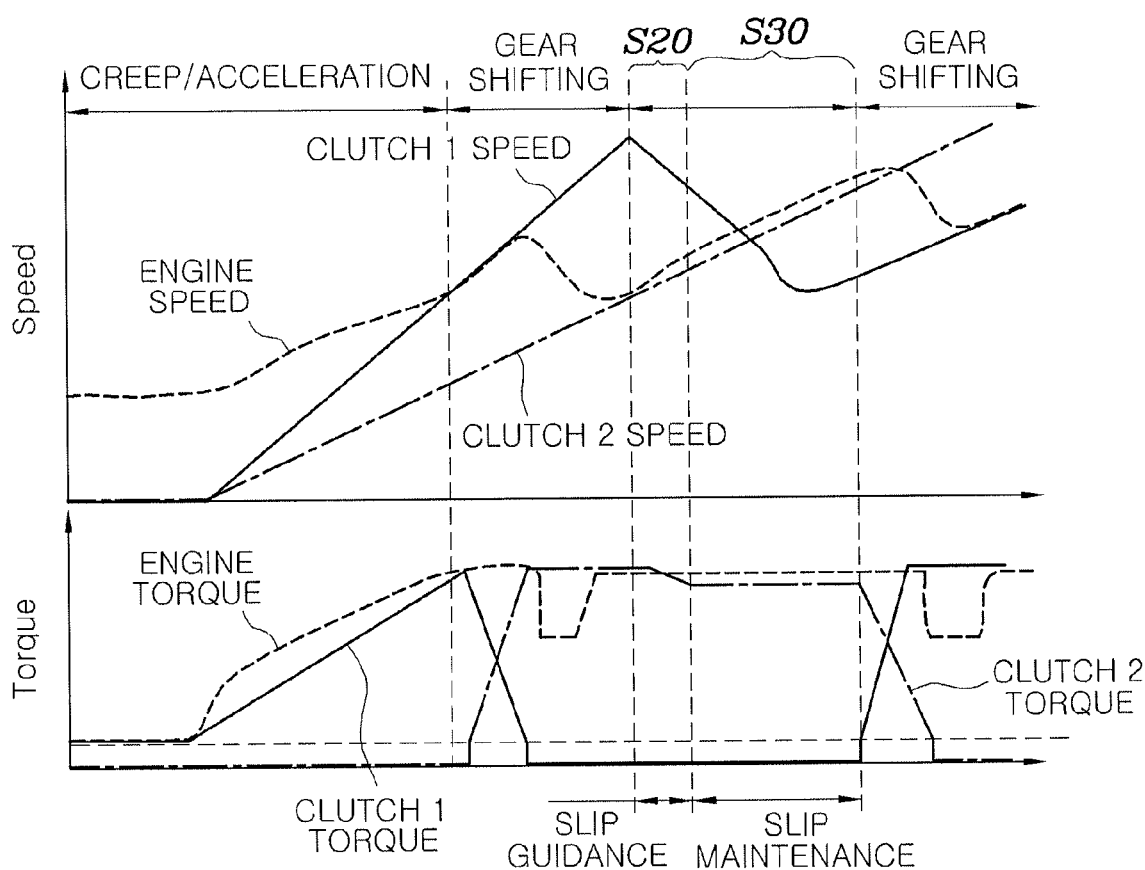
FIG. 3 is a diagram showing the application of the exemplary method of estimating the transmission torque of the dry clutch of a vehicle according to the present invention to a DCT, wherein variations in the torque and speed of an engine, clutch 1, and clutch 2 over time are represented by graphs.

That is, as shown in FIG. 3, gear shifting is completed from a gear shift step belonging to clutch 1 to a gear shift step belonging to clutch 2, so that the slip guidance step S20 is initiated at the locked state of clutch 2.

At the slip maintenance step S30, the slip may be maintained at a minute slip level less than 100 rpm from the standpoint of stable transmission of electric power.

At the transmission torque determination step S40, the transmission torque of the clutch relative to the actuator stroke at the time at which the slip of the clutch is uniformly maintained is determined to be the engine torque at the time at which the slip is uniformly maintained in consideration of a relationship indicating that the engine torque and the transmission torque of the clutch are identical to each other while the slip of the clutch is uniformly maintained.

That is, if the slip of the clutch is uniformly maintained, it can be considered that the engine torque and the transmission torque of the clutch at that time are identical to each other. Accordingly, by using this relationship, the transmission torque of the clutch is determined to be the engine torque.

Of course, after the transmission torque determination step S40, the update step S50 of incorporating the relationship between the transmission torque and the actuator stroke determined at the transmission torque determination step S40 into a T-S curve is performed. Thereafter, the stroke of the actuator is more accurately controlled based on the updated T-S curve, so that the feeling of gear shift can be improved and the durability of the clutch can be ensured.

As described above, the present invention is advantageous in that it can suitably estimate a variation in the characteristics of transmission torque relative to the actuator stroke of a dry clutch even during the driving of a vehicle, so that the dry clutch is more suitably controlled, thus acquiring the feeling of soft gear shift by preventing a gear shift shock and ensuring the durability of the dry clutch by preventing an excessive slip of the dry clutch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of estimating transmission torque of a dry clutch in an automated transmission having a controller and an actuator to control the dry clutch arranged between an engine and the automated transmission, the method comprising:
    a) releasing the clutch by the controller so that a slip of the clutch occurs;
    b) if the slip of the clutch has occurred as a result of performance of a), uniformly maintaining the slip of the clutch by the controller; and
    c) if the slip of the clutch is uniformly maintained at b), determining, by the controller, a relationship between a stroke of the actuator of the clutch and transmission torque of the clutch from a relationship between the stroke of the actuator and torque of the engine in the uniformly maintained slip state.

2. The method of claim 1, wherein b) is configured to uniformly maintain the slip at a minute slip level less than 100 rpm.

3. The method of claim 1, wherein c) is configured to determine transmission torque of the clutch relative to the stroke of the actuator at a time at which the slip of the clutch is uniformly maintained to be the torque of the engine while the slip of the clutch is uniformly maintained in consideration of a relationship indicating that the torque of the engine and the transmission torque of the clutch are identical to each other while the slip of the clutch is uniformly maintained.

4. The method of claim 1, further comprising, after c), d) incorporating a relationship between the transmission torque and the stroke of the actuator determined at c) into a Torque-Speed (T-S) curve.

5. The method of claim 1, further comprising, before a), e) determining whether the clutch is engaged,
    wherein a) is performed only if it is determined that the clutch is engaged and locked.

\* \* \* \* \*